March 5, 1963
J. BARTON
3,080,039
CONVEYING MACHINE
Filed Jan. 18, 1960
6 Sheets-Sheet 3
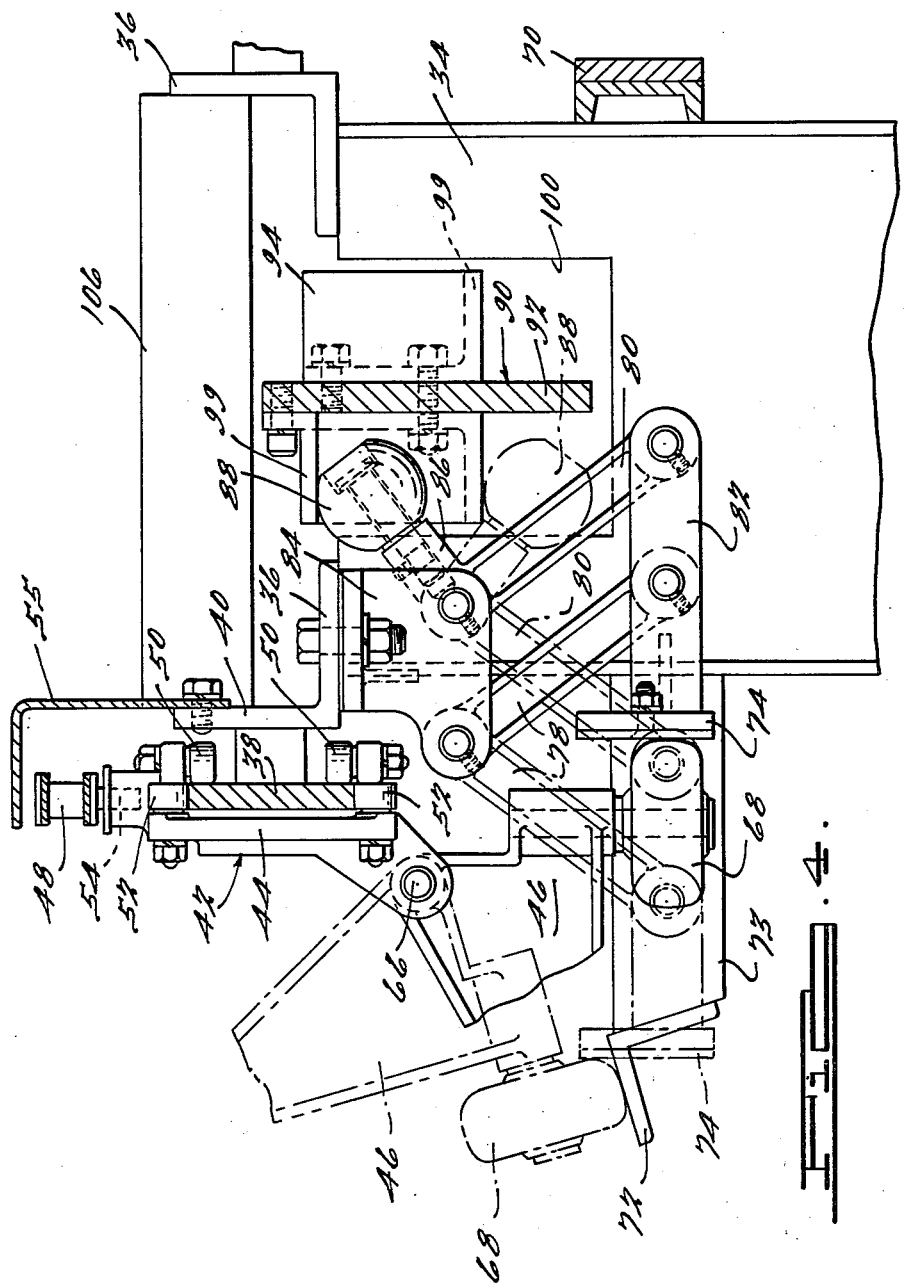
INVENTOR.
James Barton.
BY
Harness, Dickey & Pierce.
ATTORNEYS.

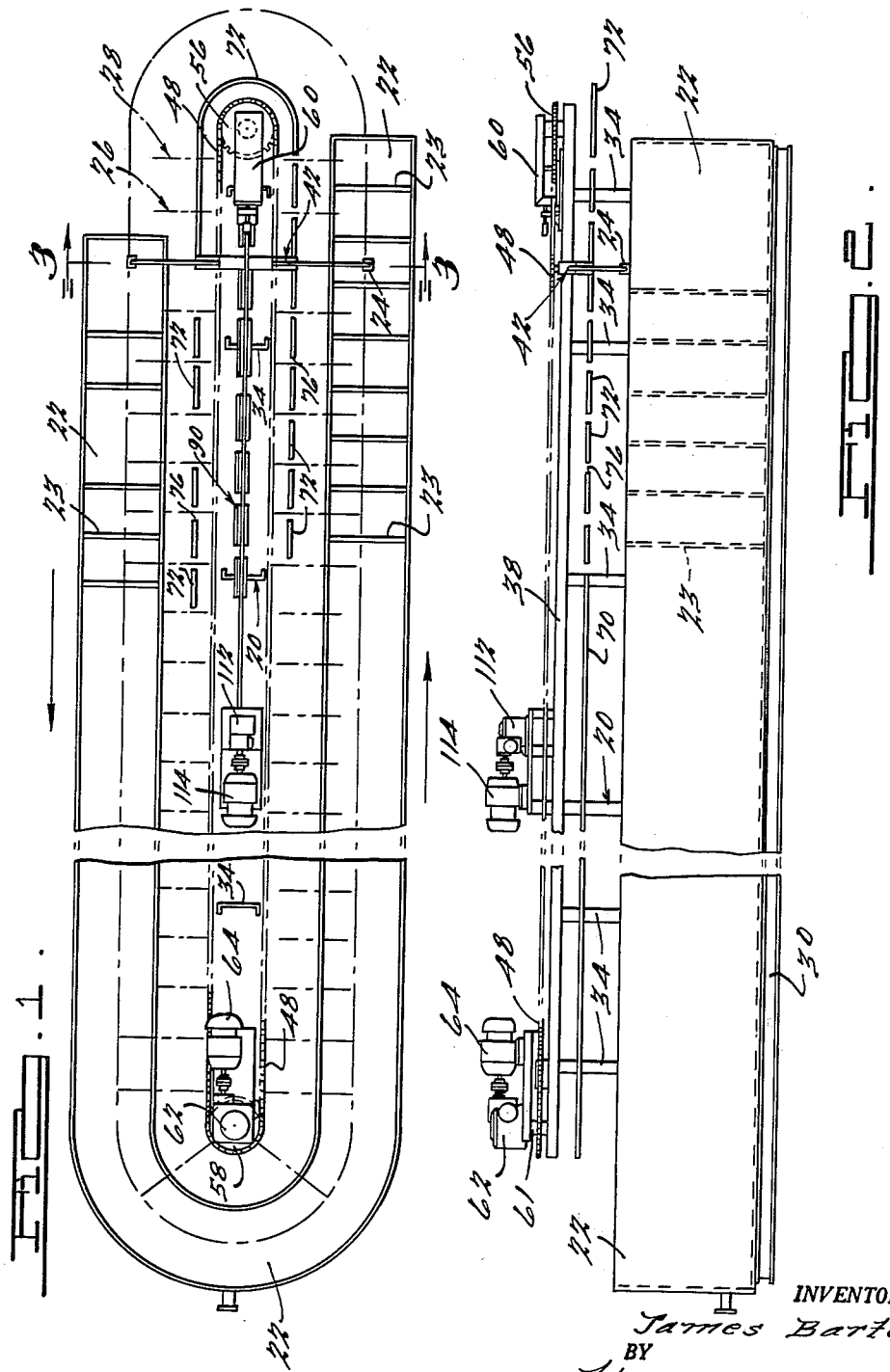

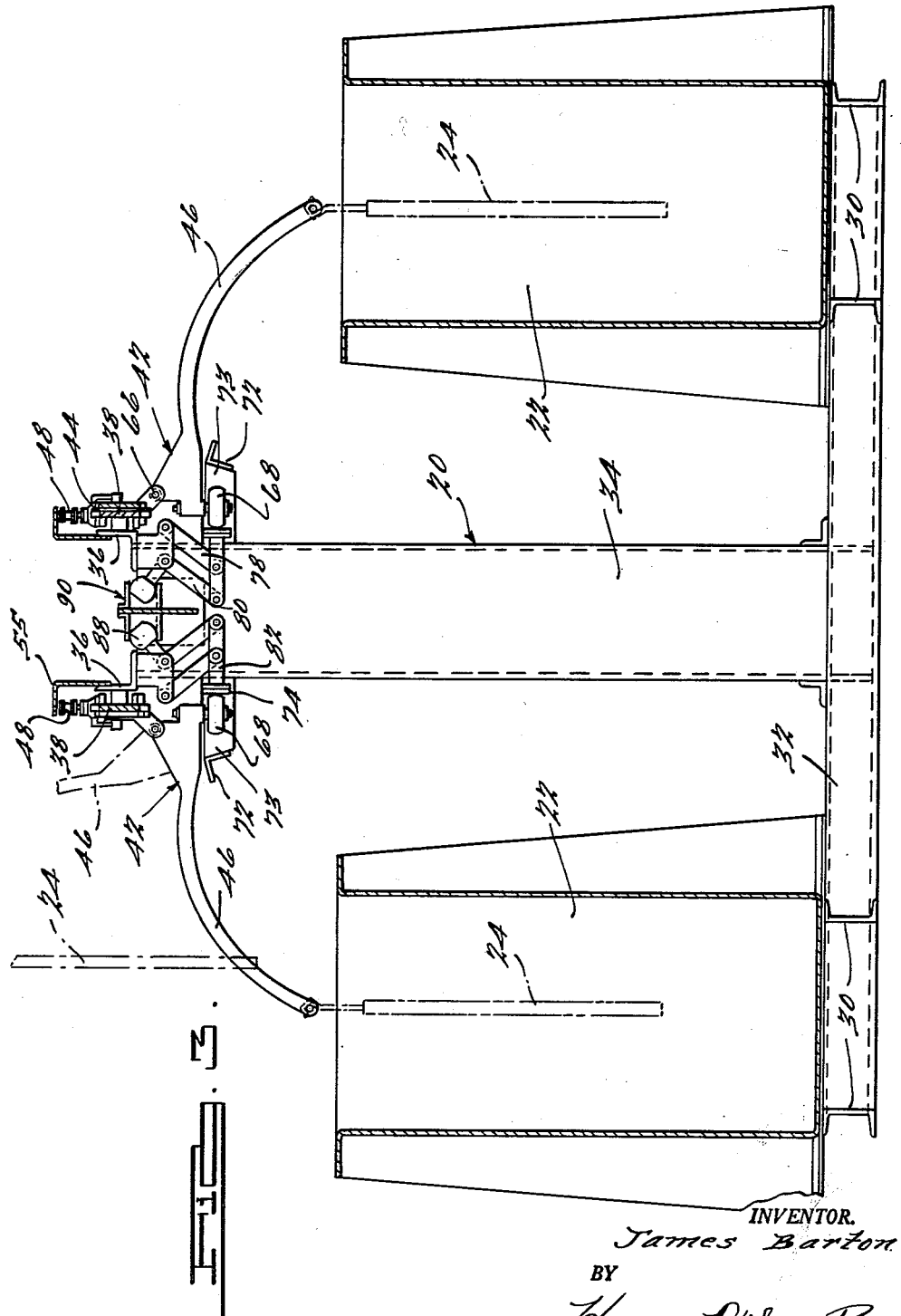

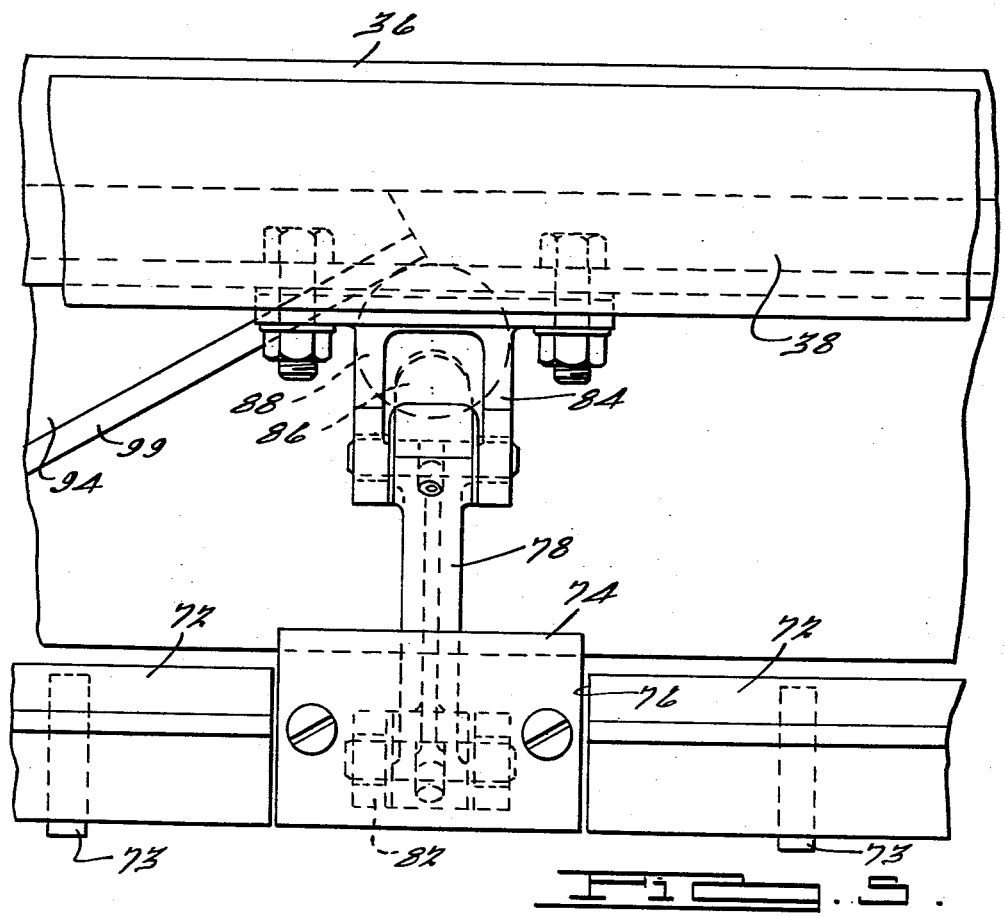

March 5, 1963
J. BARTON
3,080,039
CONVEYING MACHINE
Filed Jan. 18, 1960
6 Sheets-Sheet 5
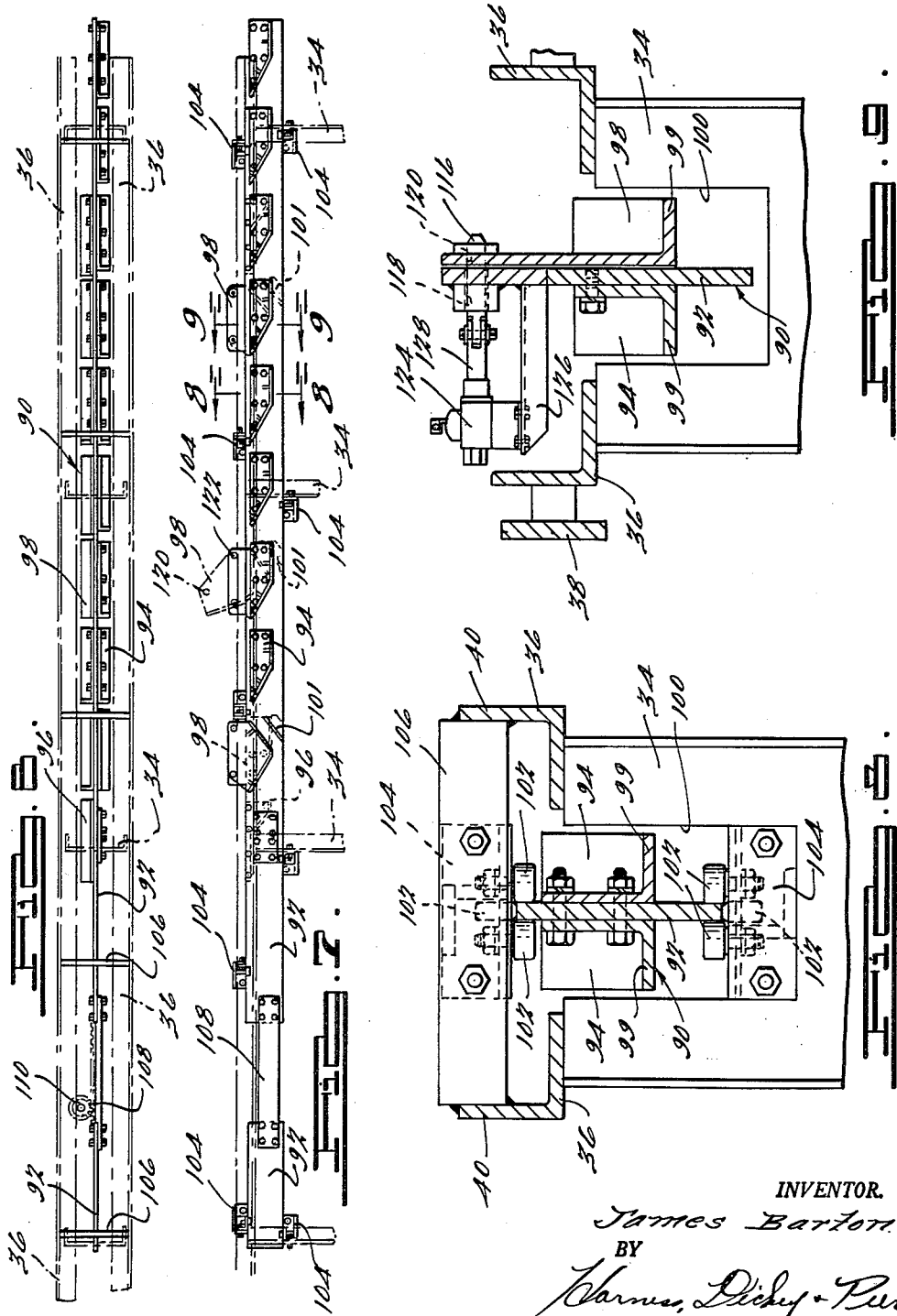
INVENTOR.
James Barton
BY
Warner, Dickey & Pierce
ATTORNEYS

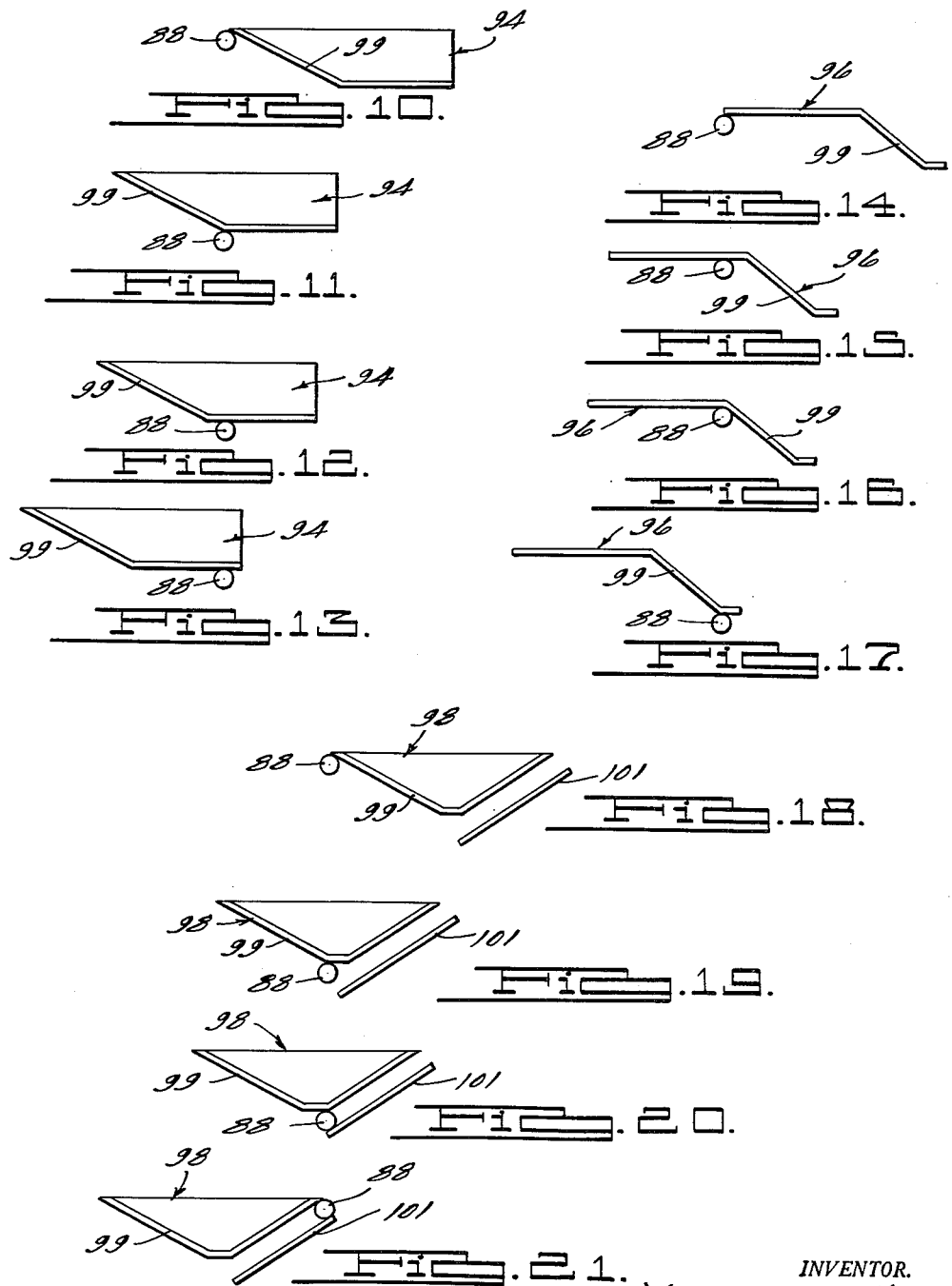

United States Patent Office 3,080,039
Patented Mar. 5, 1963

3,080,039
CONVEYING MACHINE
James Barton, Grosse Pointe Woods, Mich., assignor, by mesne assignments, to The Udylite Corporation, Detroit, Mich., a corporation of Delaware
Filed Jan. 18, 1960, Ser. No. 2,993
9 Claims. (Cl. 198—19)

This invention broadly pertains to work handling apparatus and more particularly to apparatus for conveying workpieces through a series of treating steps in a predetermined sequence.

Conveying machines of the general character herein described are extensively employed in industry for automatically processing a variety of workpieces through a series of treating sequences which often include one or more electrochemical or electroplating steps. The workpieces are conventionally supported on suitable work carriers movably mounted and driven along a supporting rail adjacent to an aligned series of treating receptacles in which the workpieces are sequentially immersed. Periodically the workpieces are raised by a suitable elevating mechanism in order that they may be transferred over the partitions separating adjoining receptacles.

A machine of this general type is disclosed in Patent 2,281,305 having a plurality of work carriers with pivotally mounted work supporting arms thereon which are raised and lowered by connecting linkage operable by a rotary cam. The disclosed machine has the disadvantages of requiring a complex, cumbersome and expensive structure to achieve the lifting action and which structure inherently has a high ratio of mechanical multiplication imposing unduly a high stresses and wear on the operating components resulting in erratic operation and machine malfunction. Applicant's machine is of similar type incorporating therein an improved lifting mechanism which is of simple and durable design and which provides for a high degree of operating flexibility and versatility.

Accordingly, it is a primary object of this invention to provide a conveying machine that is of simple construction, compact design, durable operation and of economical manufacture which provides a high degree of processing flexibility and versatility.

Another object of this invention is to provide a conveying machine incorporating therein an improved workpiece elevating mechanism that is effective to raise and lower work supporting arms in a vertical path in proper sequence and which is simply and accurately coordinated with the other operating functions of the machine.

These and other objects of this invention are accomplished by a structure characterized by a longitudinally reciprocatable slide cam mechanism having a plurality of spaced cam shoes thereon which actuate suitable linkage means to cause laterally movable lifting rail sections to move to and from alignment with an inner and an outer guide rail. By this arrangement work supporting arms on work carriers movably mounted on a supporting rail and supported by the guide rails are raised and lowered in a predetermined sequence as the workpieces are conveyed through the series of treating receptacles.

Other objects and advantages of the present invention will become apparent from the following detailed description taken in conjunction with the accompanying drawings wherein:

FIGURE 1 is a plan view of a conveying machine incorporating the preferred embodiments of this invention and illustrating a typical arrangement of treating receptacles disposed around, FIG. 2 is a side elevation view of the conveying machine shown in FIGURE 1, FIG. 3 is a transverse vertical sectional view of the conveying machine shown in FIGURE 1 and taken along lines 3—3 thereof.

FIG. 4 is an enlarged fragmentary transverse sectional view of the work carrier and cam lifting mechanism shown in FIG. 3, FIG. 5 is a fragmentary side elevation view of a laterally movable guide rail section or pad and the parallelogram linkage connected thereto as shown in FIG. 4, FIG. 6 is a plan view of the reciprocatable slide cam assembly, FIG. 7 is a vertical elevation view of the slide cam assembly shown in FIG. 6, FIGS. 8 and 9 are transverse vertical sectional views through the slide cam assembly shown in FIG. 7 taken along lines 8—8 and 9—9, respectively, thereof, FIGS. 10-13 are diagrammatic elevation views illustrating the operating sequence of a double-action cam, FIGS. 14-17 are diagrammatic elevation views illustrating the operating sequence of a set-down cam, and FIGS. 18-21 are diagrammatic elevation views illustrating the operating sequence of a lifting cam.

Referring now to the drawings and as may be best seen in FIGURES 1-4, a conveying machine incorporating the preferred embodiments of this invention is comprised of an elongated central frame 20 around which a series of aligned treating receptacles or tanks 22 are positioned separated by intervening tank partitions 23 and in which tanks the workpieces 24 are sequentially immersed. At treating stations where an electrochemical or electroplating operation is to be performed, the workpieces may be electrified by any of the well known means such as, for example, electrified bus bars (not shown) disposed above the treating receptacles 22 and and adapted to contact the workpieces 24 when they are lowered into the treating solution. The specific conveying machine illustrated in the drawings is of the turn-around type wherein the travel of the worrkpieces is in a closed looped pattern commencing at the loading station generally indicated by 26 (FIGURE 1) through the treating receptacles 22 in the direction of the arrows and terminating at an unloading station 28 adjacent to the loading station 26. It will of course be appreciated by those skilled in the art that the specific embodiments of this invention are equally applicable to conveying machines of the straight-through type wherein the workpieces are loaded at one end of the machine and are conveyed therealong through the treating receptacles and unloaded at the other end thereof.

The central frame 20 in the specific conveying machine herein described is comprised of a series of longitudinal base channels 30 connected to each other by a series of transverse base channels 32 providing a rigid supporting base platform on which the treating receptacles 22 are mounted. A series of spaced upright columns 34 are rigidly affixed at their lower ends to transverse base channels 32 and are interconnected at their upper ends by longitudinal angle iron support beams 36 extending substantially the entire length of the central frame 20. A work supporting rail 38 is rigidly affixed to the upstanding flange 40 of longitudinal support beams 36 and extends in a continuous loop around the entire central frame 20. The supporting rail 38 is comprised of a pair of straight rail sections extending along the straight side portions of the central frame 20 and connected at their ends by semicircular arcuate turn-around rail sections. A plurality of work carriers 42 each comprising a roller bracket 44 and a pivotally mounted work supporting arm 46, are movably mounted on the supporting rail 38 and intermittently advanced therealong by a continuous drive chain 48. To minimize friction the roller bracket 44 is provided with side rollers 50 and edge rollers 52 in rolling engagement with the sides and edges, respectively, of the supporting rail 38. The work carriers 42 are detachably connected to the drive chain 48 by means of drive pins 54 depending from the drive chain 48 and disposed in slidable engagement with complementarily shaped bores in the upper portion of the roller bracket 44. An L-shaped dust shield 55 detachably affixed to the upstanding flange 40 of longitudinal support beam 36 overlies the drive chain 48 to shield the chain from extraneous dust particles.

As shown in FIGURES 1 and 2, the drive chain 48 extends around the central frame 20 above the supporting rail 48 and is supported at the arcuate turn-around portions of the machine by an idler sprocket 56 at one end of the machine and a drive sprocket 58 at the other end of the machine. The idler sprocket 56 is rotatably mounted at substantially the center of curvature of the arcuate turn-around section of the machine and is longitudinally movable with respect to the frame by a take-up assembly 60 which provides for adjustment of the tension of the drive chain 48. At the other end of the machine the drive sprocket 58 is rotatably mounted on a vertical shaft 61 of speed reducer 62 which in turn is drivingly coupled to electric drive motor 64. By this arrangement, the work carriers 42 are simultaneously and intermittently advanced along the supporting rail 38 in increments corresponding to the distance between adjacent treating stations.

The work supporting arm 46 is pivotally mounted on roller bracket 44 by means of a pivot pin 66 enabling vertical movement of work supporting arm 46 between a lowered position as shown in FIG. 3 and a raised position as shown in phantom in FIGS. 3 and 4. The work supporting arm 46 is provided with a cam follower or roller 68 rotatably mounted on the lower inner portion thereof. When the work supporting arm 46 is in the lowered position, the roller 68 is in rolling contact with an inner guide track 70 rigidly affixed to the upper side portions of the upright columns 34 and when in the raised position the roller 68 is in rolling contact with an outer guide track 72 laterally spaced from the inner guide track 70 and rigidly affixed to the central frame 20 by lateral braces 73. The coaction between the roller 68 and the inner guide track 70 or the outer guide track 72 maintains the work supporting arm 46 in the appropriate lowered or raised position at the treating stations and during the transfer of the work carriers 42 therebetween. Movement of the work supporting arm 46 between the lowered and raised positions is achieved by a laterally movable guide track section or pad 74 which is movable to and from alignment with the inner guide track 70 and the outer guide track 72. The inner guide track 70 and the outer guide track 72 are provided with appropriate sized gaps 76 to enable lateral movement of pad 74 into and out of alignment therewith. Generally, outer guide track sections 72 are provided only between treating stations having an intervening tank partition 23 disposed therebetween and which outer guide track sections serve to maintain the work supporting arms 46 and the workpieces 24 suspended therefrom in an elevated position during the transfer movement. Outer guide track sections 72, as shown diagrammatically in FIGURE 1, may also be provided at the load and unload stations to facilitate loading and unloading of the workpieces. In addition, outer guide track sections (not shown) may be detachably secured at selected positions along the central frame 20 to provide for a "skip-operation" whereby the workpieces 24 are omitted or skip one or more treating receptacles or portions thereof. The inner guide track sections 70 are provided along treating stations of a multiple station tank and serve to support the work supporting arms in the lowered position while the workpieces are immersed in the treating solutions and during their transfer in the lower position to the next station of the multiple station tank. At single station tanks, no inner guide track 70 is provided since the pad 74 serves to support the work supporting arm while in the lowered position and during its pivotal movement to and from the raised and lowered positions. Lateral movement of the pad 74 to and from a retracted and a projected position is achieved by a parallelogram linkage comprising a swing link 78 and a bell crank 80 which are pivotally connected at their lower ends to a lateral bracket 82 affixed to and extending rearwardly from the pad 74 and at their upper ends to a U-shaped bracket 84 affixed to the support beam 36 as may be best seen in FIGS. 4 and 5. The free arm 86 of the bell crank 80 is provided with a substantially spherical cam follower 88 rotatably affixed thereto and in axial alignment therewith. Actuation of the parallelogram linkage to cause the pad 74 to move laterally between a projected and a retracted position is achieved by the coaction of the cam follower 88 and a longitudinally reciprocatable cam slide assembly 90 which will be subsequently described in detail.

The parallelogram linkage shown in the drawings is compact in size and is disposed immediately adjacent to the slide cam assembly 90 so that only a low ratio of multiplication is required to impart the necessary lateral movement to the lifting pad. This results in a relatively low loading of the parts with an attendant low wear rate assuring prolonged satisfactory operation. It will be appreciated by those skilled in the art that an alternate satisfactory linkage in lieu of the parallelogram linkage shown comprises pivoting the pad 74 about a point as close as possible to the point of pivot of the supporting arm 46 without interference therewith whereby the pad 74, when actuated by the slide cam assembly 90 will move through an arc similar to that of the roller 68 on the supporting arm 46. The parallelogram linkage arrangement shown in the specific machine herein described moves the pad 74 in a substantially flat arc assuring smooth and continuous contact of the face of the pad with the periphery of the roller 68 on the work supporting arm. As will be noted in FIG. 4, the peripheral surface of the roller 68 on the supporting arm 46 is contoured so as to minimize sliding friction between the roller 68 and the pad 74 when the work supporting arm 46 is raised and lowered by the lateral movement of the pad 74. Moreover, when the pad 74 is in its fully projected position as shown in phantom in FIG. 4 the roller 68 is tangential to both the forward surface of the pad 74 and the upper surface of outer guide track 72. By this arrangement, the roller 68 passes smoothly on and off the pad 74 from the outer guidetrack 72 as the work carriers 42 are advanced along the supporting rail 38.

The reciprocatable slide cam assembly 90 as may be best seen in FIGS. 6–8 is comprised of an elongated slide plate 92 having a series of cam shoes including double-action cams 94, set-down cams 96 and lifting cams 98 detachably secured to the side surfaces thereof in appropriate longitudinally spaced relationship. The upper end portions of upright columns 34 are provided with an appropriately sized opening 100 in which the slide cam assembly 90 is disposed and longitudinally reciprocatable therethrough. Slide plate 92 is laterally and vertically supported by a series of rollers 102 in rolling contact with the upper and lower edge portions thereof as shown in FIG. 8. The rollers 102 along the lower edge of the slide plate 92 are rotatably supported by a suitable mounting bracket 104 rigidly attached to the upright column 34. The rollers 102 in rolling engagement with the upper edge portion of the slide plate 92 are rotatably mounted on a similar mounting bracket 104 secured to transverse brace 106 extending between the upstanding flanges 40 of longitudinal support beams 36.

Longitudinal reciprocation of the slide cam assembly 90 is accomplished by the coaction between a gear rack 108 detachably secured between sections of slide plates 92 and a pinion gear 110 in constant meshing engagement therewith. The pinion gear 110 is affixed to a vertical shaft of a speed reducer 112 which is drivingly coupled to a reversible electric drive motor 114 as shown in FIGURES 1 and 2. Accordingly, by alternately driving the speed reducer 112 in one direction and then in the other direction the slide cam assembly 90 is caused to reciprocate through a predetermined longitudinal displacement at a preselected speed. The length of the reciprocating stroke of the slide cam assembly 90 between the fully retracted and fully advanced positions may be satisfactorily controlled by suitable limit switches mounted on the central frame 20 and actuatable in response to the movement of the cam slide assembly to deenergize the drive motor 114 when the fully advanced or retracted positions are attained. The reciprocating movement of the slide cam assembly 90 is coordinated with the intermittent transfer movement of the drive chain 48 whereby the work supporting arms 46 are sequentially raised and lowered in proper sequence as the workpieces 24 are conveyed through the treating receptacles 22.

As the slide cam assembly 90 is reciprocated the horizontally extending flanges 99 of the cam shoes 94, 96 and 98 coact with the spherical cam followers 88 on the bell cranks 80 causing the parallelogram linkages to laterally move the pads 74 to and from alignment with the inner guide track 70 and the outer guide track 72. In the specific conveying machine herein described three types of cam shoes as hereinbefore mentioned are employed to attain the desired operation of the pads at the various stations along the central frame. Variations in the operating characteristics of the cam shoes are determined by the specific configuration of their respective flanges 99. The use of the various cam shoe types and their arrangement on the slide plate 92 are dependent on the specific treating sequence and the arrangement of the treating receptacles 22 around the central frame 20. The double-action cams 94 are effective during the advancing movement of the slide cam assembly to depress the spherical cam follower 88 causing the parallelogram linkage to move the pad 74 from alignment with the inner guide track 70 outwardly into alignment with the outer guide track 72. During that movement a work supporting arm 46 having its roller 68 positioned on the pad 74 is pivoted outwardly and upwardly causing the work supporting arm 46 to be moved from a lowered to a raised position. On the retracting stroke of the slide cam assembly the double-acting cam 94 lowers the work supporting arm 46 of the next work carrier advanced along the supporting rail 38. The set-down cam 96 is effective to move the pad 74 from alignment with the inner guide track 70 outwardly into alignment with the outer guide track 72 on the advancing stroke of the slide cam assembly 90 after a work carrier in the lowered position has been advanced off the pad 74 and into rolling contact with the inner guide track 70. The pad 74 in its fully projected position is in alignment to receive the next roller 68 on the next work carrier having its work supporting arm 46 in the elevated position. Subsequent retraction of the slide cam assembly 90 causes the pad 74 to laterally retract into alignment with the inner guide track 70 whereby the work supporting arm 46 is moved from the raised position to the lowered position. The lifting cams 98 are effective during the initial portion of the advancing stroke to cause the pad 74 actuated thereby to move from the retracted position in alignment with the inner guide track 70 to the projected position in alignment with the outer guide track 72 whereby a work supporting arm 46 is moved from the lowered to the raised position. The pad 74 is maintained in the outward position by the lifting cam 98 for a period sufficient to permit the work supporting arm positioned thereon to be transferred off the pad and on to the adjacent outer guide track 72 after which the pad 74 is again withdrawn to the retracted position in alignment with the inner guide track 70 and in position to receive the next work carrier having its work supporting arm 46 in the lowered position. Since the pad 74 is in an unloaded condition during its movement from the projected to the retracted position, a secondary cam 101 is provided assuring positive retraction of the pad. As shown in FIG. 7, the secondary cam 101 is detachably secured to the slide plate 92 in spaced parallel relationship to the lowering ramp portion of the flange 99 of the lifting cam 98 providing guidance for the spherical cam follower 88 and assuring that it follows the contour of the lowering ramp. To avoid movement of the pad by the lifting cam 98 during the retracting stroke of the slide cam assembly 90 each of the lifting cams 98 is provided with an engageable and disengageable slide pin 116 as may be best seen in FIG. 9. The slide pin 116 is slidably mounted in a bore 118 in the slide plate 92 which is in axial alignment with a bore 120 in the forward portion of the lifting cam 98. When the slide pin 116 is withdrawn beyond engagement with the bore 120 in the lifting cam 98, the lifting cam 98 is free to pivot upwardly to the inoperative position shown in phantom in FIG. 7 about its rearward pivot 122. The lateral movement of the slide pin 116 into and out of engagement with the bore 120 in the lifting cam 98 is achieved by a solenoid 124 mounted on a lateral brace 126 affixed to slide plate 92 and having a resiliently biased plunger 128 in axial alignment with and connected to slide pin 116. Upon energization of the solenoid 124 the plunger 128 is retracted and slide pin 116 is withdrawn from engagement with the bore 120. On de-energization of the solenoid 124 the plunger 128 is resiliently biased toward the outward position thereby urging slide pin 116 back into engagement with bore 120. As will be noted in FIG. 9 the forward end of slide pin 116 is tapered to facilitate alignment with the bore 120. Solenoid 124 is energized when the reciprocatable slide cam assembly 90 has attained the fully advanced position enabling the lifting cam 98 to pivot upwardly during the retracting stroke of the slide cam assembly 90 over the spherical cam follower 88 which is maintained undisturbed in the upper position by the weight of a work supporting arm 46 having its roller 68 in bearing contact with the pad 74. When the cam slide assembly 90 has reached its fully retracted position and the lifting cam 98 has cleared the spherical cam follower 88, the weight of the lifting cam 98 causes it to pivot back to its operative position and the resiliently biased plunger 128 of the de-energized solenoid 124 urges slide pin 116 into engagement with the bore 120 in the forward portion thereof locking it in the operative position preparatory to the next advancing stroke.

In view of the operating function of the three types of cam shoes employed in the specific machine herein described it will be apparent to those skilled in the art that the double-action cams 94 are generally employed at stations along the central frame adjacent to single-station tanks for lowering and subsequently raising the work supporting arms 46 of successive carriers providing a single-station treatment. The set-down cams, on the other hand, are generally employed at the first station of a multiple-station tank to lower a work supporting arm from the raised position to the lowered position and in which lowered position the work supporting arms are advanced to the next station of the multiple-station tank. The operation of the lifting cam 98 is opposite to that of the set-down cam 96 and accordingly is employed at the last station of the multiple-station tank and is effective to lift a work supporting arm 46 transferred in the lowered position to a raised position so that the workpieces suspended therefrom may be transferred over a partition separating the multiple-station tank from the next adjoining treating receptacle. The aforementioned cam shoes are also applicable at other treating stations along the central frame to obtain variations in the treating sequence such as a delayed set-down, skip, or early pick-up operation.

The operating sequence of the conveying machine will now be described with particular reference to FIGS. 10–

21. When the slide cam assembly 90 is in the fully retracted position the spherical cam followers 88 are positioned relative to double-action cams 94, set-down cams 96 and lifting cams 98 in the positions shown in FIGS. 10, 14 and 18, respectively. With the spherical cam followers 88 in the positions shown the pads 74 actuated thereby are in the retracted positions in alignment with the inner guide track 70 and the work supporting arms 46 having their rollers 68 in bearing contact with the respective pads 74 are in the lowered position. At the completion of a predetermined dwell period which may be controlled, for example, by a suitable dwell timer, the cam slide assembly drive motor 114 is energized causing the cam slide assembly 90 to start its forward movement. During the initial forward movement of the cam slide assembly as shown by FIGS. 11, 15 and 19, the cam followers 88 in contact with the double-action cam 94 and the lifting cam 98 are depressed by the lifting ramp portions of the horizontal flanges 99 causing the work supporting arms 46 in contact with the pads connected thereto to be raised to the elevated position. During the same movement of the slide cam assembly the spherical cam follower 88 in contact with the set-down cam 96 remains vertically fixed as it moves in rolling contact along the forward portion of the horizontal flange 99 of the set-down cam 96. When the cam slide assembly attains a forward position relative to the spherical cam followers as shown in FIGS. 11, 15 and 19 the electric transfer motor 64 is energized causing the drive chain 48 to advance the work carriers 42 along the supporting rail 38. The speed at which the work carriers are transferred along the supporting rail is controlled so that the rollers 68 on each of the supporting arms 46 moves off the pads 74 and on to the guide track in alignment therewith before the slide cam assembly attains a position relative to the spherical cam follower 88 as shown in FIGS. 12, 16 and 20. Thereafter, the slide cam assembly and drive chain continue to move concurrently until the slide cam assembly reaches its fully advanced position as shown in FIGS. 13, 17 and 21. During the latter advancing movement of the slide cam assembly the pad 74 actuated by the double-ation cam 94 remains in the fully projected position. On the other hand, the pad actuated by the set-down cam 96 is laterally moved from the retracted to the projected position while the pad actuated by the lifting cam 98 is moved from the fully projected position back to the fully retracted position during the remaining advancing movement of the slide cam assembly. The completion of the advancing movement of the reciprocating slide cam assembly precedes the completion of the horizontal transfer movement of the drive chain 48. Accordingly, the pads 74 are positioned in alignment with a guide track before the roller 68 on the next advancing work supporting arm 46 being advanced along that guide track moves into bearing contact with the pad. By this arrangement the pads disposed adjacent to the double-action cams 94 and set-down cams 96 which are in the fully projected position receive work supporting arms which are in the raised position having their rollers 68 supported along outer guide track 72. The pad actuated by the lifting cam 98 is in the fully retracted position wherein it receives a work supporting arm in the lowered position having its roller 68 in rolling engagement with the inner guide track 70. The transfer movement of the drive chain 48 is controlled to stop when the rollers 68 on the work supporting arms 46 are positioned substantially at midpoint of the pads 74. At the completion of the transfer movement, the slide cam assembly is retracted from the positions shown in FIGS. 13, 17 and 21 to the positions shown in FIGS. 10, 14 and 18, respectively, and during which movement the elevated work supporting arms positioned on the pads actuated by the double-action cam 94 and set-down cam 96 are lowered while the lowered work supporting arm positioned on the pad actuated by the lifting cam 98 remains in the lowered position. As hereinbefore mentioned, slide pin 116 is disengaged from the lifting cam 98 to enable the lifting cam to pivot upwardly thereby uneffecting the lowered position of the work supporting arm disposed adjacent thereto. When the slide cam assembly attains its fully retracted position it energizes a dwell timer which commences to time a predetermined treating period at the termination of which the cycle hereinbefore described is repeated.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a conveying apparatus including a frame having a rail mounted thereon on which a plurality of work carriers are movably mounted and intermittently advanced therealong, each of the work carriers having an arm extending therefrom that is movable to and from a raised position and a lowered position, the improvement comprising an elevating mechanism for raising and lowering the arms when the work carriers are stationarily positioned on the supporting rail, said elevating mechanism comprising a lifting pad engageable with one of said arms and laterally movable to and from a retracted position and a projected position whereby said arm is raised and lowered, linkage means on the frame for supporting said lifting pad, and means longitudinally reciprocatable in a direction transversely of the plane of lateral movement of said lifting pad and contacting said linkage means for causing said lifting pad to move between said positions.

2. In a conveying apparatus including a frame having a rail mounted thereon on which a plurality of work carriers are movably mounted and intermittently advanced therealong, each of the work carriers having an arm extending therefrom that is movable to and from a raised position and a lowered position, the improvement comprising an elevating mechanism for raising and lowering the arms when the work carriers are stationarily positioned on the supporting rail, said elevating mechanism comprising a lifting pad engageable with one of said arms and laterally movable to and from a retracted position and a projected position whereby said arm is raised and lowered, linkage means on the frame for supporting said lifting pad, and longitudinally reciprocatable slide means having a plurality of cams thereon, one of said cams contacting one of said linkage means to cause said lifting pad to move between said positions as said reciprocatable slide means is reciprocated in a direction substantially perpendicular to the plane of lateral movement of said lifting pad.

3. In a conveying apparatus including a frame having a rail mounted thereon on which a plurality of work carriers are movably mounted and intermittently advanced therealong, each of the work carriers having an arm extending therefrom that is movable to and from a raised position and a lowered position, the improvement comprising an elevating mechanism for raising and lowering the arms when the work carriers are stationarily positioned on the supporting rail, said elevating mechanism comprising a lifting pad engageable with one of said arms and laterally movable to and from a retracted position and a projected position whereby said arm is raised and lowered, linkage means for supporting said lifting pad pivotally mounted on the frame so that the lateral movement of said pad is substantially horizontal, a longitudinally reciprocatable slide cam on the frame having a plurality of cam shoes detachably secured thereto, one of said cam shoes contacting said linkage means for moving said lifting pad between said positions as said slide cam is reciprocated, and means for reciprocating said slide cam in a direction substantially perpendicular to the plane of lateral movement of said lifting pad.

4. In a conveying apparatus, the combination comprising a frame, rail means on said frame, a plurality of work carriers movably mounted on said rail means, means for intermittently advancing said work carriers along said rail means, each of said work carriers having an arm extending laterally therefrom and movable to and from a raised and a lowered position, a series of first track sections on said frame for supporting said arms when in said lowered position, a series of second track sections on said frame laterally spaced from said first track sections for supporting said arms when in said raised position, a laterally movable track section movable to and from a projected position in alignment with said second track sections and a retracted position in alignment with said first track sections for lifting and lowering said arms when said work carriers are stationarily positioned on said rail means, linkage means on said frame for supporting said laterally movable track section, means longitudinally reciprocatable and contacting said linkage means for moving said laterally movable track section between said positions when said means are reciprocated in a direction substantially perpendicular to the direction of movement of said laterally movable track section.

5. In a conveying apparatus, the combination comprising a frame, rail means on said frame, a plurality of work carriers movably mounted on said rail means, means for intermittently advancing said work carriers along said rail means, each of said work carriers having an arm extending laterally therefrom and movable to and from a raised and a lowered position, a series of first track sections on said frame for supporting said arms when in said lowered position, a series of second track sections on said frame laterally spaced from said first track sections for supporting said arms when in said raised position, a laterally movable track section movable to and from a projected position in alignment with said second track sections and a retracted position in alignment with said first track sections for lifting and lowering said arms when said work carriers are stationarily positioned on said rail means, linkage means on said frame for supporting said laterally movable track section, a longitudinally reciprocatable slide cam on said frame contacting said linkage means for moving said laterally movable track section between said positions when said slide cam is reciprocated, and means for reciprocating said slide cam in a direction substantially perpendicular to the direction of movement of said laterally movable track section.

6. In a conveying apparatus, the combination comprising a frame, rail means on said frame, a plurality of work carriers movably mounted on said rail means, means for intermittently advancing said work carriers along said rail means, each of said work carriers having an arm extending laterally therefrom and movable to and from a raised and a lowered position, a series of first track sections on said frame for supporting said arms when in said lowered position, a series of second track sections on said frame laterally spaced from said first track sections for supporting said arms when in said raised position, a laterally movable track section movable to and from a projected position in alignment with said second track sections and a retracted position in alignment with said first track sections for lifting and lowering said arms when said work carriers are stationarily positioned on said rail means, linkage means for supporting said laterally movable track section pivotally mounted on said frame so that lateral movement of said track section is substantially horizontal, a longitudinally reciprocatable slide cam on said frame having a plurality of cam shoes thereon, one of said cam shoes contacting said linkage means for moving said laterally movable track section between said positions when said slide cam is reciprocated, and means for reciprocating said slide cam in a direction substantially perpendicular to the direction of movement of said laterally movable track section.

7. In a conveying apparatus including a frame having a rail mounted thereon on which a plurality of work carriers are movably mounted and intermittently advanced therealong, each of the work carriers including an arm extending therefrom that is movable to and from a raised position and a lowered position, the improvement comprising an elevating mechanism for raising and lowering the arm when the work carrier is stationarily positioned on the supporting rail, said elevating mechanism comprising a longitudinally reciprocable slide member including a cam thereon having a first surface spaced from the longitudinal axis of said slide member and connected to at least one surface angularly inclined to said first surface, linkage means on the frame disposed adjacent to said slide member and laterally pivotable with respect thereto, a lifting pad on said linkage means and engageable with the arm, a cam follower on said linkage means disposed in contact with said cam for laterally moving said linkage means and said pad thereon to and from a retracted position and a projected position for raising and lowering an arm engaged thereby in response to longitudinal reciprocation of said slide member relative to said cam follower, and means for reciprocating said slide member to and from an advanced position and a retracted position in a direction substantially perpendicular to the plane of lateral movement of said lifting pad and said linkage means.

8. In a conveying apparatus including a frame having a rail mounted thereon on which a plurality of work carriers are movably mounted and intermittently advanced therealong, each of the work carriers including an arm extending therefrom that is movable to and from a raised position and a lowered position, the improvement comprising an elevating mechanism for raising and lowering the arm when the work carrier is stationarily positioned on the supporting rail, said elevating mechanism comprising a parallelogram linkage disposed adjacent to said slide member and including a pair of laterally spaced links disposed in substantially parallel relationship pivotally connected at their upper ends to the frame and at their lower ends to a lateral member pivotally connected thereto, a lifting pad on said lateral member and engageable with one of the arms, a cam follower on one of said links disposed in contact with said cam for laterally moving said lateral member and said pad thereon to and from a retracted position and a projected position for raising and lowering an arm engaged thereby in response to longitudinal reciprocation of said slide member relative to said cam follower, and power means for reciprocating said slide member to and from an advanced position and a retracted position in a direction substantially perpendicular to the plane of lateral movement of said lifting pad and said linkage means.

9. In a conveying apparatus including a frame having a rail mounted thereon on which a plurality of work carriers are movably mounted and intermittently advanced therealong, each of the work carriers having an arm extending therefrom that is movable to and from a raised position and a lowered position, the improvement comprising an elevating mechanism for raising and lowering the arms when the work carriers are stationarily positioned on the supporting rail, said elevating mechanism comprising a longitudinally reciprocable slide member including a cam pivotally mounted thereon and movable to and from an operative position and an inoperative position, means selectively actuable for engaging and maintaining said cam in said operative position during movement of said slide member in one direction and for releasing said cam for movement to said inoperative position during movement of said slide member in the opposite direction, said cam having a surface spaced from the longitudinal axis of said slide member connected at its ends to a lifting surface and a lowering surface angularly disposed relative thereto, linkage means on the frame disposed adjacent to said slide member and laterally pivotable with respect thereto, a lifting pad on said linkage means and engageable with one of the arms, a cam follower on said linkage means disposed in contact with said cam for laterally moving said linkage means and said pad thereon to and from a retracted position and a projected position in response to longitudinal reciprocation of said cam when in said operative position relative to said cam follower, and means for reciprocating said slide member to and from an advanced position and a retracted position in a direction substantially perpendicular to the plane of lateral movement of said lifting pad and said linkage means.

References Cited in the file of this patent
UNITED STATES PATENTS 1,965,284    Finston _____ July 3, 1934